United States Patent [19]
Hart et al.

[11] Patent Number: 5,610,489
[45] Date of Patent: Mar. 11, 1997

[54] METHOD AND APPARATUS FOR MACHINE CONTROL

[75] Inventors: Roger L. Hart, Cincinnati; Rickey L. Busick, Lebanon, both of Ohio

[73] Assignee: Trinova Corporation, Maumee, Ohio

[21] Appl. No.: 575,264

[22] Filed: Dec. 20, 1995

Related U.S. Application Data

[63] Continuation of Ser. No. 296,772, Aug. 26, 1994, abandoned.

[51] Int. Cl.$^6$ ................................................. G05B 19/404
[52] U.S. Cl. ........................... 318/571; 318/618; 318/625; 318/632
[58] Field of Search .................................... 318/560, 565, 318/571, 600, 601, 602, 605, 618, 625, 638, 640, 652, 653, 654, 661

[56] References Cited

U.S. PATENT DOCUMENTS

| | | | |
|---|---|---|---|
| 3,564,379 | 2/1971 | Bakel et al. | 318/603 |
| 3,691,357 | 9/1972 | McIntosh | 235/151.11 |
| 3,703,016 | 11/1972 | Schramm et al. . | |
| 4,044,894 | 8/1977 | McDonald et al. . | |
| 4,045,660 | 8/1977 | Weisgerber et al. | 235/151.11 |
| 4,430,606 | 2/1984 | Otsuki et al. | 318/601 |
| 4,438,917 | 3/1984 | Janssen et al. . | |
| 4,484,287 | 11/1984 | Gamo et al. | 364/474 |
| 4,505,207 | 3/1985 | Bagaric et al. . | |
| 4,629,955 | 12/1986 | French et al. | 318/625 |
| 4,657,239 | 4/1987 | Ikesue et al. . | |
| 4,665,489 | 5/1987 | Suzuki et al. . | |
| 4,808,899 | 2/1989 | Swope | 318/619 |
| 4,970,449 | 11/1990 | Kawamura et al. | 318/569 |
| 5,013,988 | 5/1991 | Sakano | 318/602 |
| 5,021,673 | 6/1991 | Dragon et al. . | |
| 5,023,434 | 6/1991 | Lanfer et al. . | |
| 5,394,222 | 2/1995 | Genovese | 355/208 |

*Primary Examiner*—Bentsu Ro
*Attorney, Agent, or Firm*—Jones, Day, Reavis & Pogue

[57] ABSTRACT

A control for machine members propelled at plural points along their length to move linearly transverse to member length determines and eliminates skew of the driven points. Skew is determined from position indicated by position transducers associated with the driven points. Various types of position transducers are accommodated, including encoders having outputs from which member position can be determined only with reference to marker outputs of the transducer. For such encoders, the control effects velocity controlled motion to detect position. Skew is eliminated by relatively moving the driven points by the magnitude of the skew.

12 Claims, 7 Drawing Sheets

METHOD AND APPARATUS FOR MACHINE CONTROL

This application is a continuation of application Ser. No. 08/296,772 filed on Aug. 26, 1994, now abandoned.

BACKGROUND OF THE INVENTION

I. Field of the Invention

This invention relates generally to control of machines and particularly to eliminating relative misalignment of a plurality of driving means spaced along the length of a moveable member, the member being propelled by the driving means to move linearly transverse to its length and the misalignment being measured parallel to the direction of motion.

II. Description of Related Art

Figure 1A:
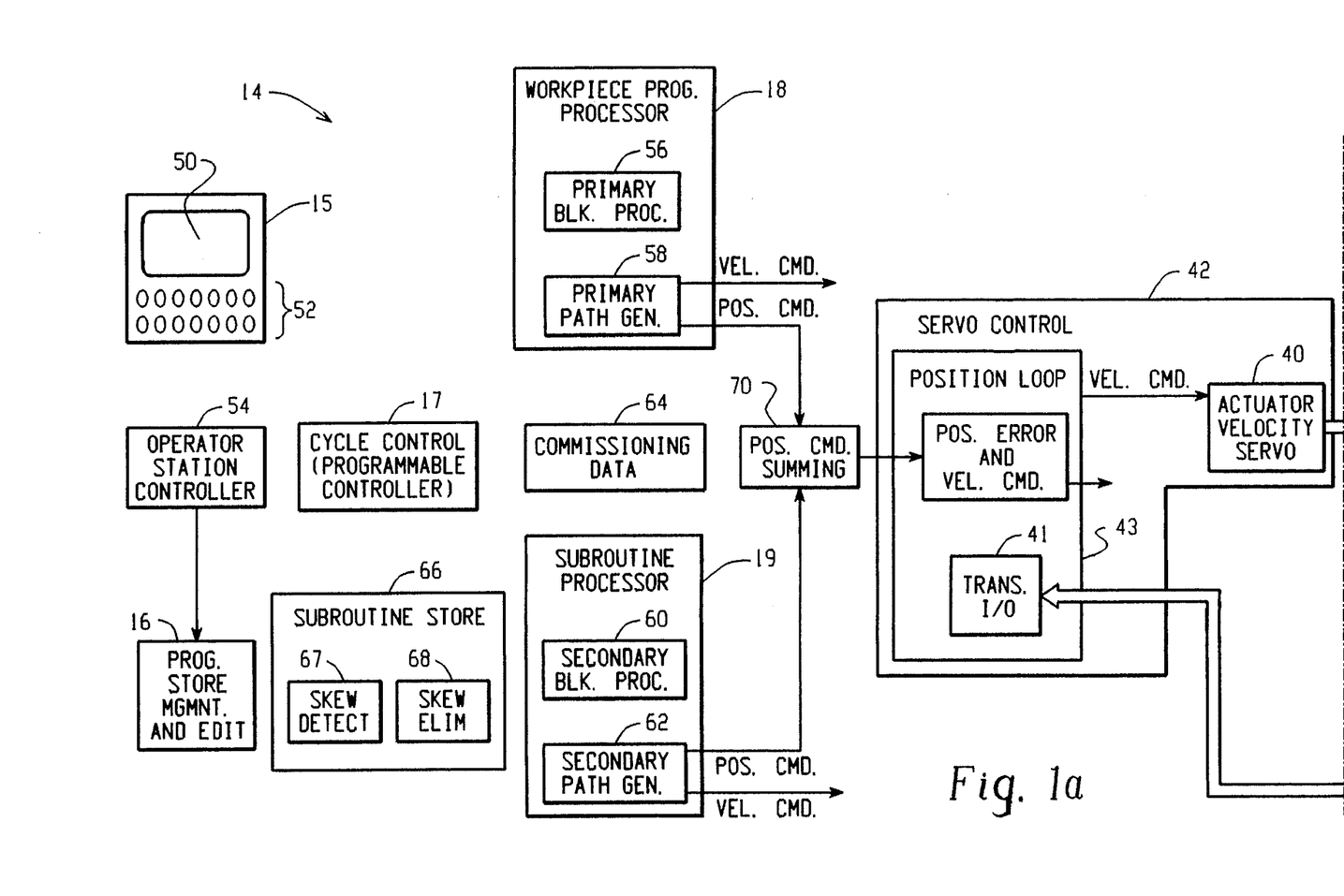
FIG. 1 is a block diagram of a machine member and a control for effecting motion of the member.
Figure 1B:
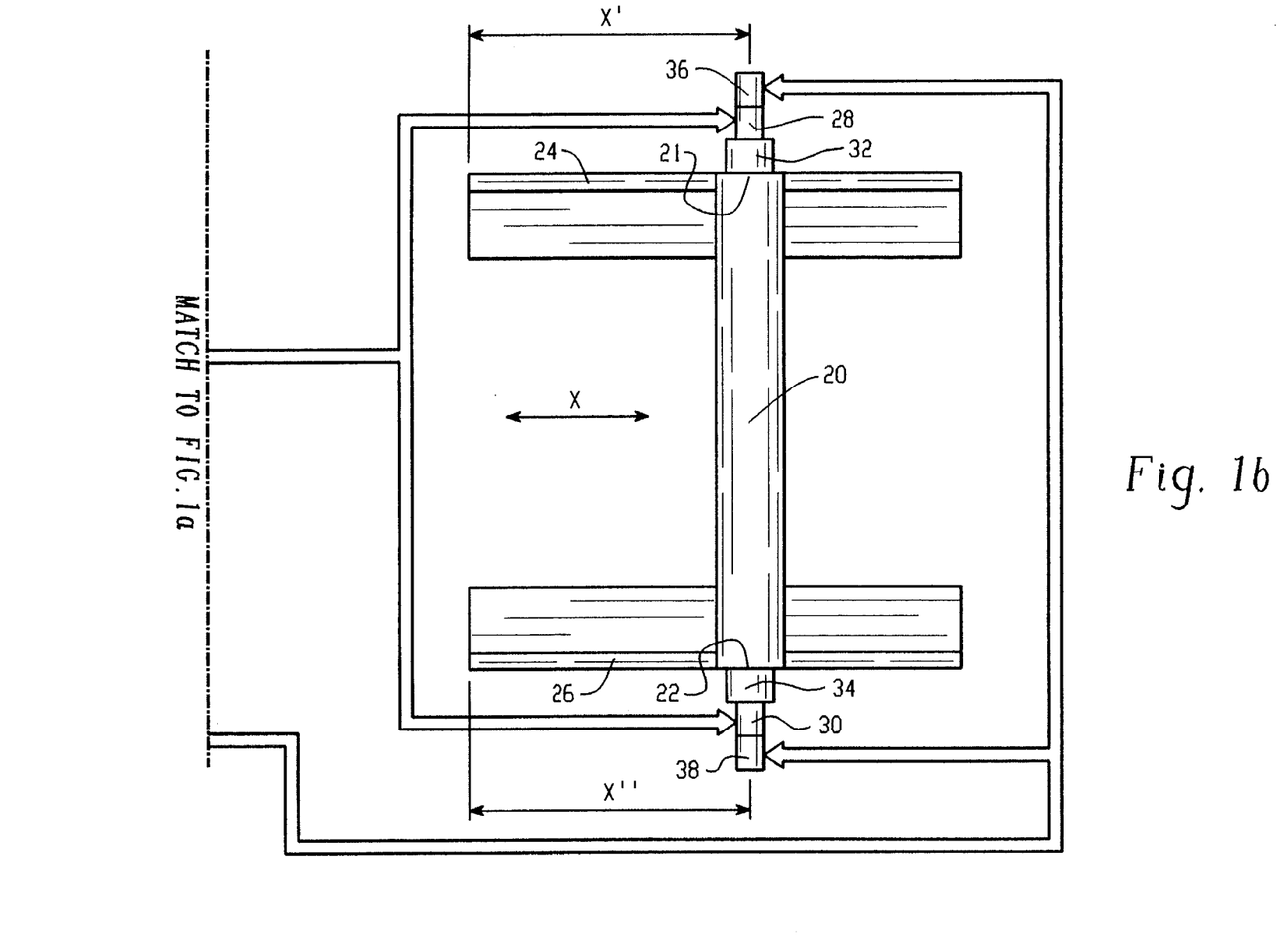

An example of machine construction giving rise to misalignment of driving means of a machine member, referred to as skew, is illustrated in FIG. 1. Machine member 20 is moveable along rails 24 and 26 as indicated by the double ended arrow "X". Skew is defined as a difference of the positions of the driving means or driven points of machine member 20 as measured relative to a common reference and parallel to the axis of motion. For example, in FIG. 1 skew is represented by a difference in the values of X' and X". Movement of member 20 is imparted by, respectively, actuators 28 and 30 driving through transmissions or gear trains 32 and 34, respectively, at distal ends 21 and 22. It will be appreciated that machine constructions may include additional driving means spaced along the length of member 20. The driving means may include, for example, pinions engaging racks on the rails to propel member 20. Other driving devices may be included in the driving means for driving member 20 such as, for example, nuts rotated by actuators and engaging screws mounted parallel to the rails.

Member 20 and driving means 28 and 30 are arranged to propel member 20 linearly along the rails 24 and 26, the rails being substantially parallel to one another and substantially perpendicular to member 20. Skew may introduce binding of member 20 against rails 24 and 26 as well as poor engagement of the driving means. Skew can result in unsatisfactory response of actuators 24 and 26 to the control thereof and may result in excessive mechanical wear or damage to member 20, rails 24 and 26 or the driving means. Skew may arise as a result of forces acting on member 20 during periods when actuators 28 and 30 are not energized and therefore not active to maintain positions of ends 21 and 22. In light of the adverse consequences of skew, it is desirable to eliminate skew before initiation of extensive motion of member 20.

It is known from U.S. Pat. No. 4,045,660 to return a machine member to a desired location following power interruption using values of measured position determined upon power loss and upon power restoration. It is known from U.S. Pat. No. 4,484,287 to restore a moveable machine member to a desired position following power interruption by storing position information in a nonvolatile memory upon power loss for recall upon restoration of power. From U.S. Pat. No. 5,013,988 it is known to use presettable counters in conjunction with absolute encoders to create and update absolute position data, the data being updated so long as power is applied to the measuring system. From U.S. Pat. No. 4,629,955 it is known for control of motion of a machine member driven at distal ends to vary servomechanism gain of the driving means to eliminate skewing therebetween. The control of this patent provides only for reduction of skew attributable to differences in loading on the driving means during execution of motion. Servomechanism position control effected in accordance with this patent does not provide for detection, reduction or elimination of skew between the driving means upon application or restoration of power.

The controls of the aforesaid references addressing restoration of position after power interruption all rely on absolute position information which is immediately available upon application or restoration of power. However, in the event sufficient absolute position data is not available on application of power, it must be determined from position transducers. Sufficient position data will not exist if, during a period when position control is disabled, positional changes are not monitored and the range of position measurement transducers is less than the potential magnitude of positional change or the output of the position transducers while the machine member is stationary do not provide any indication of position whatsoever. Position transducers of the latter type include incremental or semi-absolute encoders, which are favored for providing high resolution position measurement over extended distances.

SUMMARY OF THE INVENTION

It is an object of the present invention to provide detection and reduction of relative misalignment of driving means effective to move a single moveable member linearly transverse to its length.

It is a further object of the present invention to provide detection and reduction of relative misalignment of driving means for effecting linear movement of a moveable member wherein the magnitude of misalignment is determined by a procedure selected according to the type of position transducer associated with the driving means.

Further objects and advantages of the present invention shall become apparent from the following description and the accompanying drawings.

A control of a moveable member driven to effect motion transverse to its length by driving means associated with driven points spaced along that length determines the magnitude of relative misalignment of the driven points, the misalignment being measured parallel to the direction of motion. As applied wherein position of the ends is measured by transducers producing marker outputs, the magnitude of relative misalignment is determined from distances between occurrences of marker outputs during motion in one direction. Driving means are controlled to effect relative movement of the driven points to reduce the relative misalignment in accordance with the magnitude as determined.

BRIEF DESCRIPTION OF THE DRAWINGS

FIG. 3a is a flow chart of a procedure for determining the magnitude of misalignment.

FIG. 3b is a flow chart of a procedure for eliminating the misalignment determined in accordance with FIG. 3a.

FIG. 4 is a flow chart of a procedure included within the procedure of the flow chart of FIG. 3a.

DESCRIPTION OF THE PREFERRED EMBODIMENT

To illustrate the invention, an apparatus and method constituting a preferred embodiment developed for Cincinnati Milacron Inc., the assignee of the subject invention, shall be described in detail. The control of the preferred embodiment contemplates use of a variety of position transducers including semi-absolute scales. Characteristics of selected transducers shall be described with reference to FIGS. 2a–2f.

Position Transducers

Figure 2A:
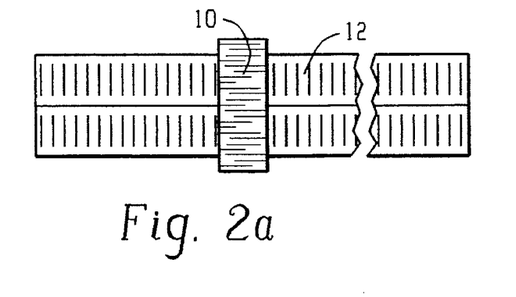
FIG. 2a illustrates a linear encoder.
Figure 2B:
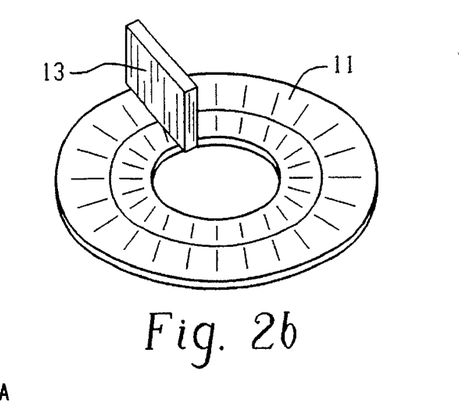
FIG. 2b illustrates a rotary encoder.

FIG. 2a. illustrates a linear encoder comprising a slider 10 and a scale 12. Devices which operate optically or electromagnetically are known, the common characteristic being that throughout the range of travel of the slider, the scale has precisely subdivided regions which are differentiated by sensing elements of the slider. Typically, scale 12 is fixed and slider 10 is moved relative thereto by movement of a machine member. In addition to the linear encoder illustrated in FIG. 2a, rotary encoders are known as illustrated in FIG. 2b in which a disk 11 contains the differentiated regions and sensors 13 are supported relative to the disk to detect the regions. Rotation of the disk relative to the sensors may be imparted by an actuator or motor which also propels a machine member or by a transmission coupling motion of a machine member to the rotatable element of the encoder. The indicated angular position of the rotary encoder is converted to linear position data, when appropriate, according to the conversion defined by the mechanical coupling between the rotating member of the encoder and the linearly moveable machine member.

Figure 2C:
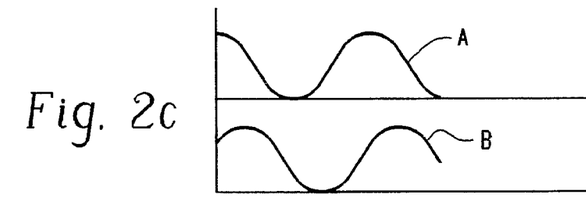
FIG. 2c illustrates one form of encoder outputs.
Figure 2D:
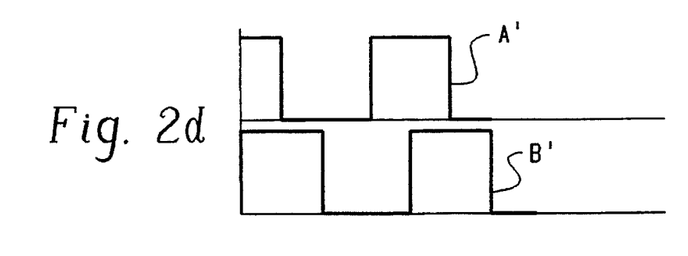
FIG. 2d illustrates a second form of encoder outputs.

In response to the subdivided regions, the encoder sensors produce two outputs, such as outputs "A" and "B" as illustrated in FIG. 2c. These outputs may be conditioned to produce signals such as "A'" and "B'" of FIG. 2d. As illustrated, each of outputs "A" and "B" or "A'" and "B'" have values which cyclically repeat throughout the range of the transducer, i.e. the length of scale 12 or the circumference of the circle of disk 11 passing under the sensors. The cycles of the "A" and "B" outputs are offset one from the other by one quarter of the cyclic pattern. The length of the cycle of values defines the pitch of the output, i.e. range/cycles. The resolution of position measurement is a function of the form of the outputs and the differentiation of one from the other. For example, where the "A" and "B" outputs are available and are sinusoidal functions, measurement resolution is limited only by the ability of the interface to differentiate values of the sine function. Where only "A'" and "B'" outputs are available, resolution is limited to one fourth of the output pitch.

Figure 2E:
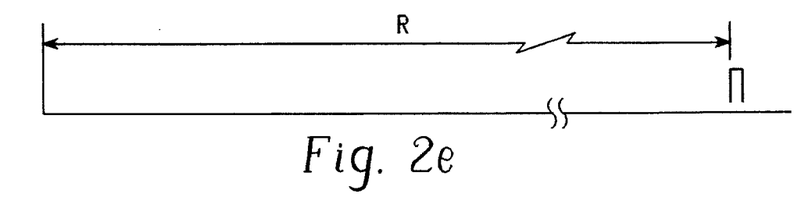
FIG. 2e illustrates marker outputs of a digital encoder
Figure 2F:
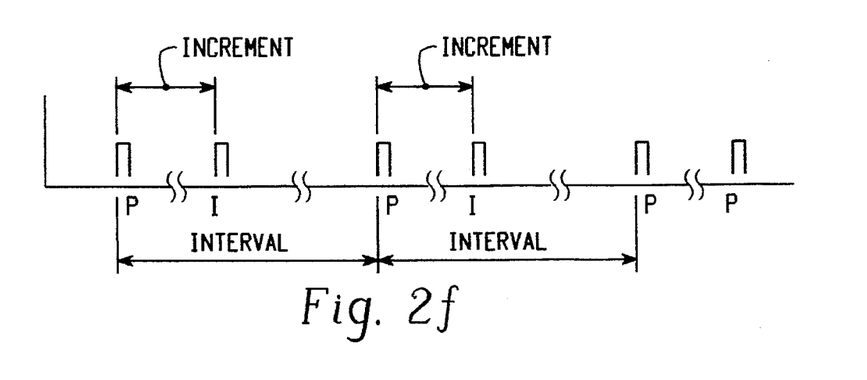
FIG. 2f illustrates marker outputs of a semi-absolute encoder.

In addition to the "A" and "B" outputs, marker outputs are produced designating locations within the range R of transducer position measurement at predetermined intervals. In the case of conventional encoders, referred to herein as digital encoders, a single marker output is produced within the range R of the encoder as illustrated by FIG. 2e. Absolute position is determined using the location of the marker as a reference and accumulating distance as measured by the "A" and "B" outputs from the reference. In the case of encoders referred to herein as semi-absolute encoders, plural marker outputs occur within the range of R the encoder as illustrated by FIG. 2f. The magnitude of each distance INCR between a primary marker P and an intermediate marker I is unique within the range R of, for example, scale 12, each distance INCR being greater, by a constant increment, than the immediately next nearest to a selected end of the scale. The magnitude of the distance INT between successive primary markers P is constant throughout the encoder range R. Absolute position is determined from the increment distance according to the following:

$$ACTPOS = INCR * M \tag{1}$$

Where:

INCR=distance from primary marker to intermediate marker in direction of increasing increment magnitude M=ratio of distance interval to constant interval increment Computer Numerical Control Apparatus for controlling a machine member, such as member 20 of FIG. 1, to eliminate skew in accordance with the invention may advantageously comprise a computer numerical control such as the ACRAMATIC 950 control available from Cincinnati Milacron Inc. Elements of such a computer numerical control shall be described with reference to FIG. 1. Driving means of member 20 are controlled by servomechanism control 42. Velocity of actuators 28 and 30 are controlled by actuator velocity servo control 40. Position control is effected by position servo control 43 which generates velocity commands for velocity servo control 40. Position servo control 43 may be included as an element of CNC 14 or may be combined with velocity servo control 40 as part of servomechanism control 42 as illustrated. A single coordinate axis position command PCMD is used to generate position commands, designated as PCMD' and PCMD", for actuators 28 and 30. Control of operation of plural actuators in response to a single coordinate axis position command PCMD is referred to as split axis control.

Position servo control 43 detects differences between commanded position values and actual position values to control driving means of member 20. Actual position of ends 21 and 22 are represented by outputs of position transducers 36 and 38, respectively. Position transducer interface 41 includes interface circuitry for receiving and conditioning output signals of position transducers. For encoders of the types described hereinbefore, transducer interface 41 includes circuitry for receiving "A" and "B" or "A'" and "B'" outputs and detecting the occurrence of marker outputs. In addition, transducer interface 41 performs the function of discriminating changes of position from the "A" and "B" or "A'" and "B'" outputs and generating pulses representing incremental changes of position in accordance with the transducer measurement resolution.

In FIG. 1 position transducers 36 and 38 are shown as they would be arranged where actuators 28 and 30 are motors and rotatable elements of transducers 36 and 38 are driven by shafts of the motors. Alternatively, position transducers such as linear scales of the type described with reference to FIG. 2a may be used which measure positions of ends 21 and 22 directly relative to rails 24 and 26 respectively.

Position commands for position servo control 43 are generated by, for example, a computer numerical control (CNC) 14. CNC 14 includes: an operator or user interface facility 15; workpiece program storage and edit facilities 16; commissioning data store 64; subroutine store 66; machine cycle control 17; workpiece program processor 18; and subroutine processor 19. Overall operation of the CNC is determined by cycle control 17, operating as a programmable logic controller. Manual and workpiece program controlled operation are effected according to operator selections made using operator interface facility 15. This facility includes a display device 50 such as a CRT or other alphanumeric display device, a manual data entry device such as keyboard 52 and an operator station controller 54.

Position commands $PCMD_I$, where I designates a command coordinate axis, are generated by CNC 14 by, for example, execution of workpiece programs defining workpiece processing or by execution of subroutines defining certain machine functions. Workpiece programs typically conform to a known programming convention, such as EIA RS 274 and their execution is effected by workpiece program processor 18. A block processor 56 decodes program instructions and a primary path generation processor 58 periodically produces coordinate axis position commands at a predetermined machine position update interval in accordance with the machine operations specified by workpiece program instructions. These position commands reflect the rate of change of position as defined by programmed coordinates, feed rates, and cycle commands.

Subroutines are primarily intended to provide program control of particular machine functions which are independent of workpiece processing. Subroutines are stored in subroutine store 66 and are executed by subroutine processor 19. In the preferred embodiment, subroutines associated with elimination of skew are stored in subroutine store 66 and include skew detection routines 67 and skew elimination routines 68. A secondary block processor 60 decodes data of the subroutine instruction blocks and supplies coordinate data to secondary path generation processor 62. Position commands are produced by secondary path generation processor 62 at a predetermined position update interval and are summed with position commands produced by primary path generation processor 58 at summing junction 70.

Skew Elimination

Referring to FIG. 1, skew is eliminated under position control by moving ends 21 and 22 relative to one another by the magnitude of the skew. Since position servo control 43 operates to produce velocity commands in response to a difference between command position and actual position, any position command defining a position other than the current actual position at the time position servo control 43 is enabled could result in motion tending to increase the skew. Therefore, it is necessary to produce position commands conforming to current actual positions prior to enabling position servo control 43. To produce the desired position commands, skew magnitude is used to define an offset value modifying a position command for one of the actuators 28 and 30.

To determine the magnitude of the skew it is necessary to determine the positions of the driven points, i.e. ends 21 and 22, relative to a common reference. If absolute position measuring means are used which, while member 20 is stationary, produce outputs indicating position of each end anywhere within its range of travel, skew magnitude is directly calculated from indicated position of each end. If position measuring means are used which, while member 20 is stationary, give no indication of absolute position or indicate position only within a range less than the potential skew magnitude, member 20 must be moved to establish position of the ends relative to a common reference. Since position controlled movement will not be enabled until after skew has been eliminated, this required movement is effected by velocity control.

To effect velocity controlled movement for determination of skew magnitude, velocity commands are produced for velocity servo control 40 to drive actuators 28 and 30 in the same direction at a predetermined rate. As member 20 is propelled along rails 24 and 26, marker signal outputs of position transducers 36 and 38 are monitored.

Where transducers 36 and 38 are digital encoders or their functional equivalent, skew magnitude is determined from the distance traveled between occurrence of the marker signal from one transducer and the occurrence of the marker signal from the other transducer. With occurrence of a marker signal from either transducer, changes of position indicated by that transducer are monitored, measuring the distance travelled until occurrence of the marker from the other transducer. Upon receipt of the second marker signal the velocity commands for both actuators 28 and 30 are set to command zero velocity. The distance SS travelled from the occurrence of the first marker signal until occurrence of the second marker signal is stored.

Where transducers 36 and 38 are semi-absolute encoders or their functional equivalent, actual position of each end is determined by detecting two distance intervals defined by three successive marker outputs. Velocity controlled motion is continued until the occurrence of three successive markers in the outputs of both transducers. Once absolute position has been determined for each transducer, skew magnitude is calculated as the difference in the indicated absolute positions.

When there is no skew of ends 21 and 22, there may nevertheless be a difference between the positions at which marker outputs of transducers 36 and 38 will occur. This difference may arise as a consequence of differences in the locations at which encoder elements are mounted to machine elements and differences in alignments of couplings between elements of the encoders and machine elements. The magnitude of the difference, referred to herein as skew compensation and designated SCMP, is eliminated from the value of skew magnitude determined as described above to produce a skew offset value. Values of skew compensation are determined as part of alignment procedures at the time of machine construction or when position transducers are replaced or remounted to the machine after removal of the original units. Values for skew compensation SCMP may be entered into CNC 14 from the operator interface facility 15.

To produce relative movement of ends 21 and 22 for elimination of skew, the value of the position command offset derived from skew magnitude is incrementally reduced to zero with successive periodic production of position commands at a position command update rate. With each incremental reduction, position servo control 43 of the affected actuator detects a difference between the commanded and measured position and produces a velocity command for velocity servo control 40.

Skew Elimination Subroutines

Skew elimination subroutines define the procedures to be performed by CNC 14 to eliminate skew. Skew elimination may be initiated by operator selection of a skew elimination procedure or of an alignment procedure which automatically initiates execution of skew elimination subroutines. Whichever event initiates execution, subroutine processor 19 effects execution of skew detection routines 67 and skew elimination routines 68 without further operator intervention. The procedures effecting skew elimination will be described with reference to FIGS. 3a and 3b.

Figure 3A:
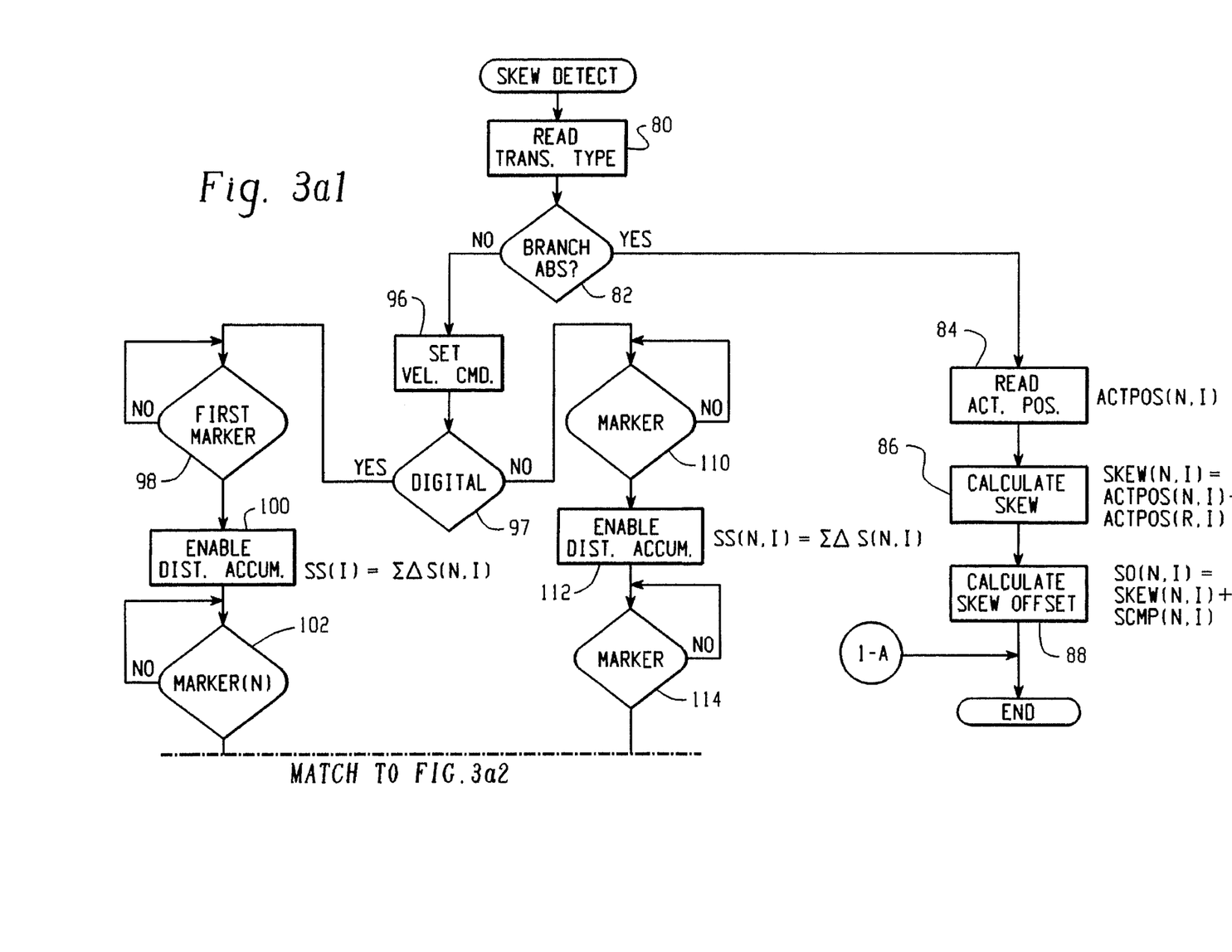
Figure 3A:
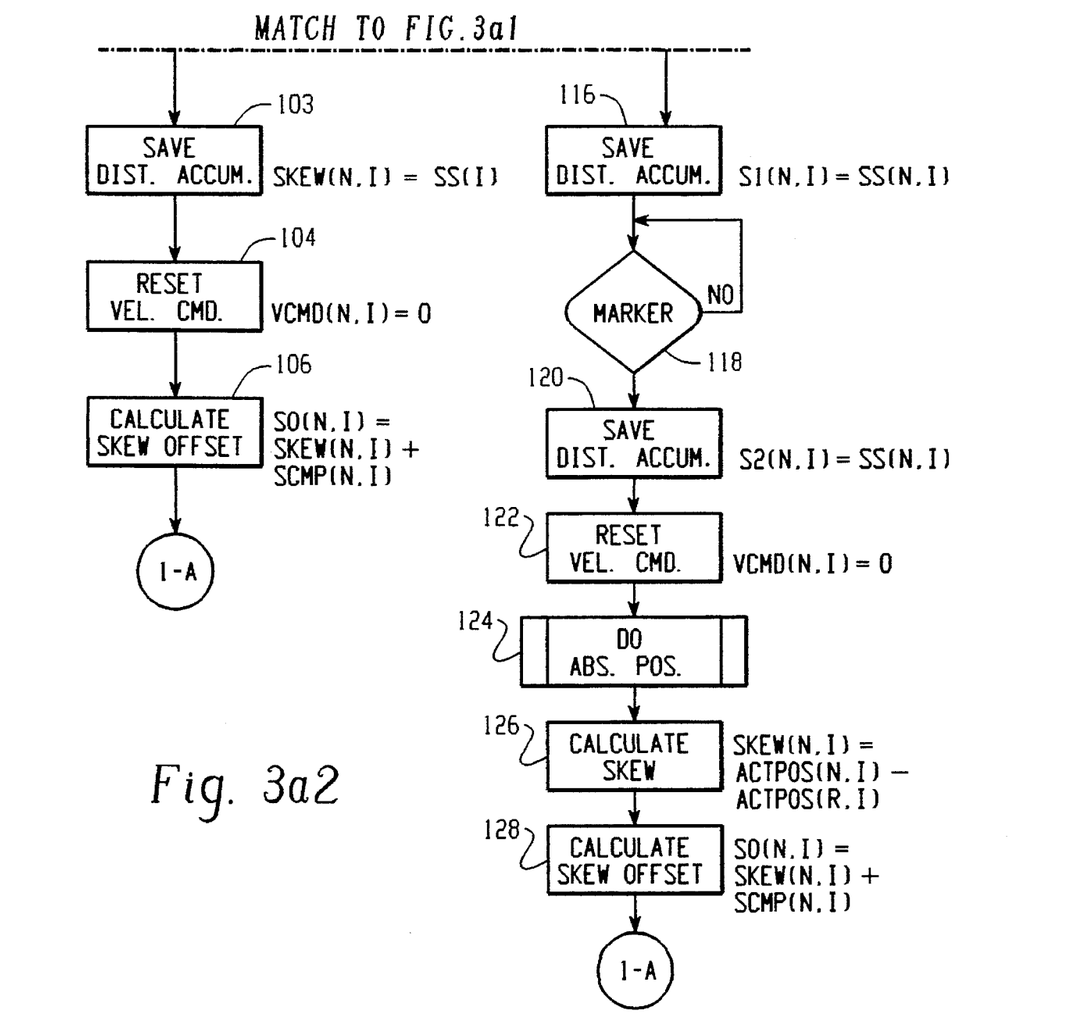

FIG. 3a illustrates a procedure for producing skew elimination offset values $SO_{N,I}$. The subscript notation contains indices designating the $N^{th}$ driven point of the $I^{th}$ command coordinate axis. At process step 80, data are read from commissioning data store 64 to identify actuators for which associated position transducers do not provide absolute position information throughout the full range of machine member motion. From procedure branch 82 subroutine execution follows alternative procedures according to the type of transducer associated with the controlled actuators.

For transducers which do not require motion of machine member 20 to determine skew magnitude, actual position data are read at process step 84. Actual position values associated with driven points are designated as $ACTPOS_{N,I}$. Processing continues at process step 86 where, skew magnitudes $SKEW_{N,I}$ are calculated as the differences between actual position values of a selected driven point $ACTPOS_{R,I}$, where the index R designates this value as the selected reference, and all other actual position values $ACTPOS_{N,I}$. At process step 88 skew offset values $SO_{N,I}$ are calculated from the skew magnitude values $SKEW_{N,I}$ and the values of corrections accounting for differences in indicated actual position without skew, $SCMP_{N,I}$.

For transducers requiring motion to determine skew magnitude, subroutine execution proceeds from branch point 82 to process step 96. There velocity commands $VCMD_{N,I}$ are produced for velocity servo control 40 to effect motion of the driven points in the same direction at a predetermined rate. The procedure branches at process branch 97 according to whether the associated transducers are digital type encoders or semi-absolute type.

Procedure execution associated with digital type encoders begins at decision step 98 which represents monitoring of the marker signal outputs for the first occurrence of a marker. Upon occurrence of the first marker, a distance accumulator is enabled at process step 100 to measure the distances travelled from the first occurrence of a marker to the occurrences of markers in each transducer output of all other driven points. The distances traveled $SS_I$ are produced by, for example, accumulating pulses representing incremental changes of position ΔS reflected in the "A" and "B" outputs of the transducer which produced the first marker. These pulses represent changes no less than the resolution of measurement determined by the nature of the "A" and "B" outputs. Decision step 102 represents monitoring of the outputs of the other transducers for occurrence of markers. Upon occurrence of a marker output detected at step 102, the accumulated distance $SS_I$ is loaded as a skew magnitude value $SKEW_{N,I}$ at process step 103. Once marker outputs have occurred for all N of the transducers of the $I^{th}$ command coordinate axis, the velocity commands $VCMD_{N,I}$ for that command coordinate axis are reset at process step 104 to halt movement of member 20. At process step 106, skew offset values $SO_{N,I}$ are calculated as the sum of the skew magnitude values $SKEW_{N,I}$ and the skew compensation values $SCMP_{N,I}$.

Procedure execution associated with semi-absolute type encoders begins at decision step 110 which represents monitoring of the marker signal outputs of a transducer for occurrence of a marker. With the first occurrence of a marker, a distance accumulator is enabled at process step 112 to produce values of accumulated distance $SS_{N,I}$ between successive occurrences of marker outputs of each transducer. Decision step 114 represents monitoring of the marker signal outputs of the transducers for occurrence of a second marker for each. Upon the second occurrence of a marker for a particular transducer, a first interval distance, designated $S1_{N,I}$ is saved at process step 116. Decision step 118 represents monitoring of the marker signal outputs for a third occurrence of a marker for each transducer. Upon the third occurrence of a marker for a particular transducer, a second interval distance, designated $S2_{N,I}$, is saved at process step 120. Once the two interval distance values have been saved for each of the N transducers of the $I^{th}$ command coordinate axis, the velocity commands $VCMD_{N,I}$ for that axis are reset to command zero velocity at process step 122. At process step 124 a procedure for determining absolute position values is performed. At process step 126 skew magnitude values $SKEW_{N,I}$ are calculated as the differences between the actual position value $ACTPOS_{R,I}$ of a reference driven point and the actual position values $ACTPOS_{N,I}$ of all other driven points. At process step 128 skew offset values $SO_{N,I}$ are calculated as the sum of the skew magnitude values $SKEW_{N,I}$ and the skew compensation values $SCMP_{N,I}$.

Figure 3B:
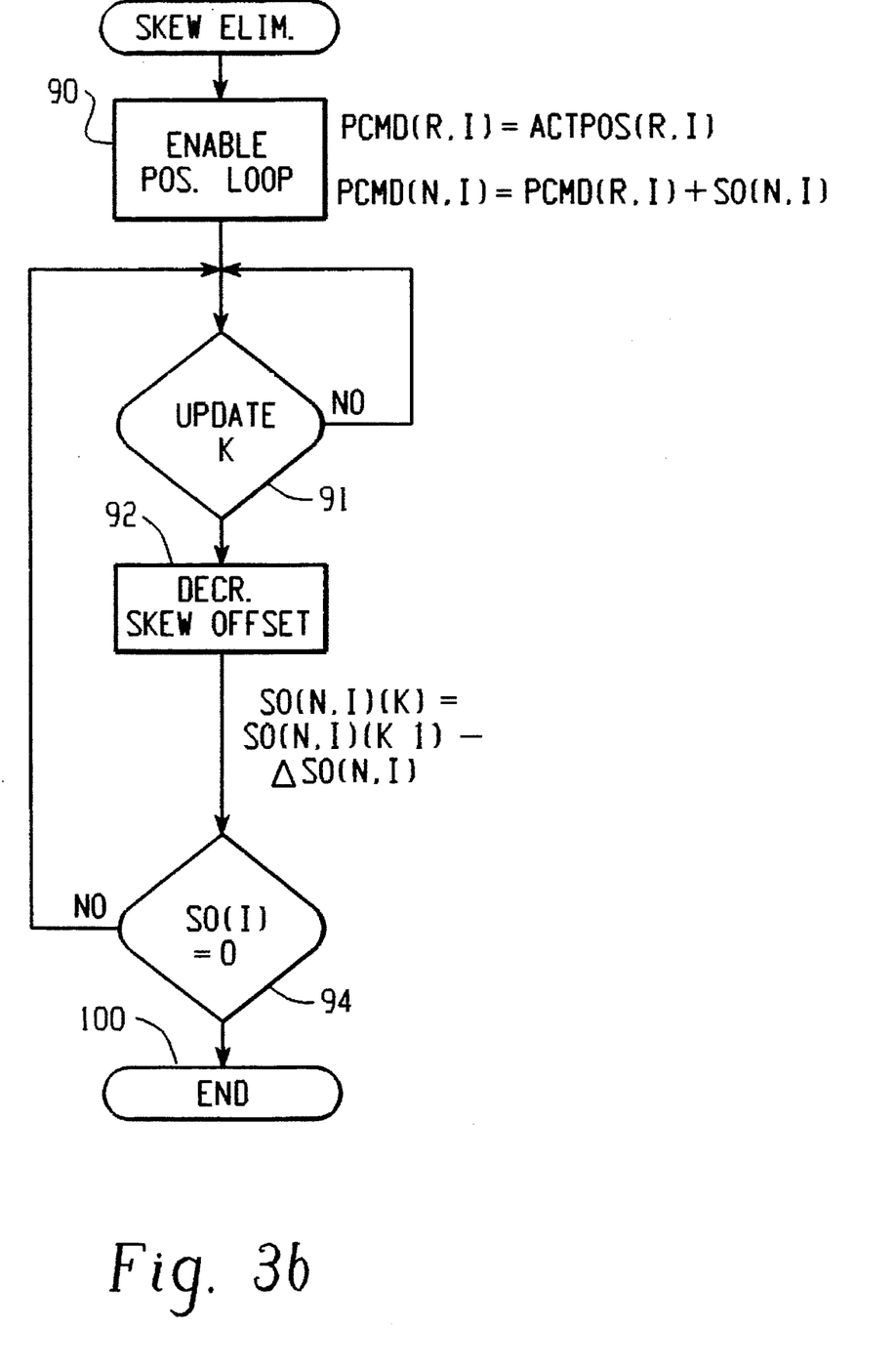

Execution of the skew elimination subroutines 68 shall be described with reference to FIG. 3b. With the values of skew offset $SO_{N,I}$ determined, execution begins at process step 90 where position servo control is enabled using values of position commands $PCMD_{N,I}$ equal to the values of actual position and the values of actual position modified by values of skew offset $SO_{N,I}$. It will be appreciated that the procedure for determining values of skew offset $SO_{N,I}$ determines offset values relative to actual position of a selected or reference driven point. Hence, a position command $PCMD_{R,I}$ for the driving means associated with the reference driven point is set equal to the indicated actual position $ACTPOS_{R,I}$ of that driven point. The position commands $PCMD_{N,I}$ for all other driving means are created from the reference position command $PCMD_{R,I}$ and the values of skew offset $SO_{N,I}$. Skew is eliminated by repeated periodic incremental reduction of the values of skew offset $SO_{N,I}$ with periodic position command updates. Decision step 91 represents the occurrence of an update interval interrupt. At process step 92 skew offsets $SO_{N,I}$ are reduced by a predetermined increment $\Delta SO_{N,I}$. At decision step 94 it is determined if the magnitude of skew offset $SO_{N,I}$ has been reduced to zero. Once all skew offsets have been reduced to zero, execution of skew elimination routines is ended as represented by terminal 108.

Figure 4:
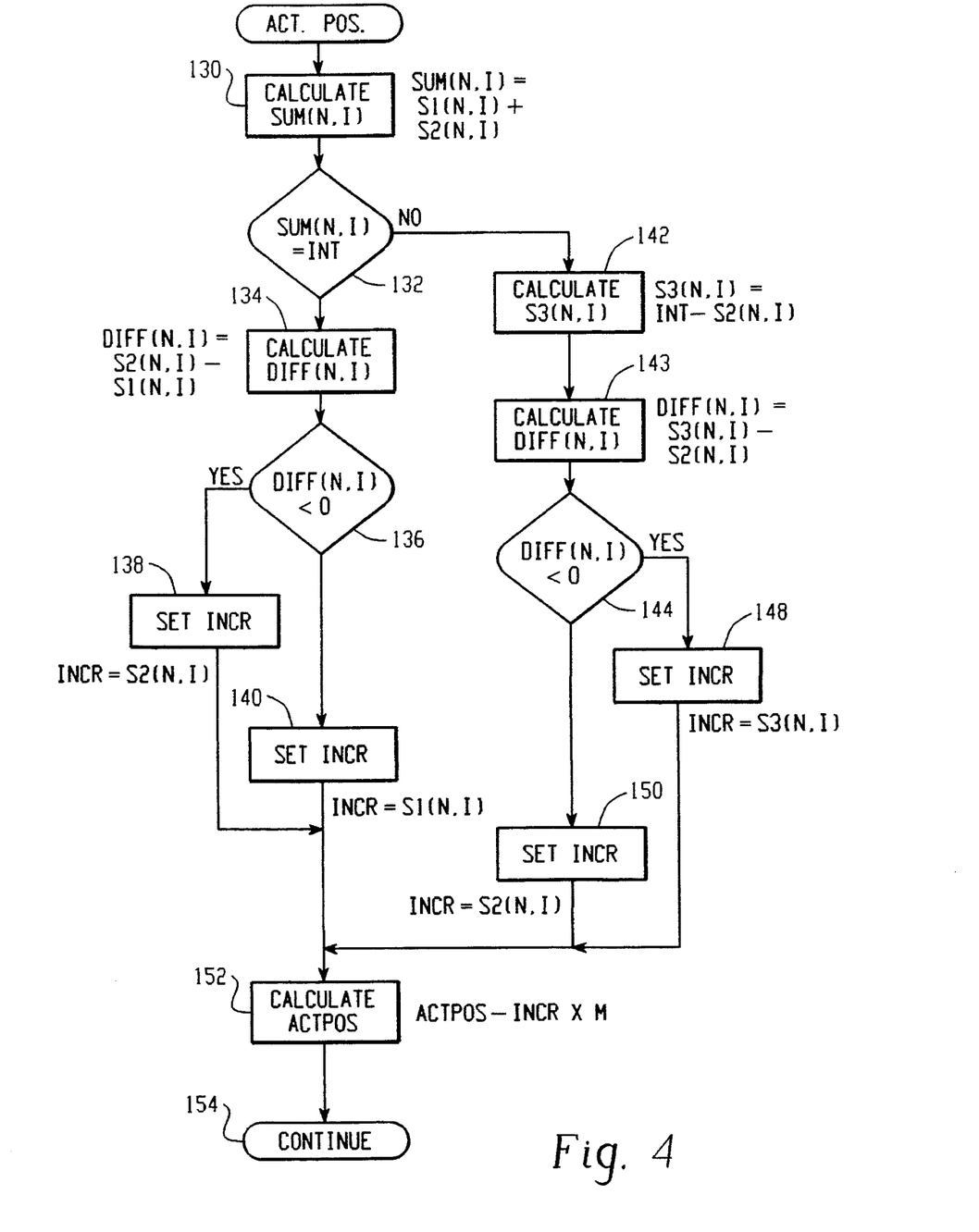

The flow chart of FIG. 4 illustrates the procedure for calculating actual position performed at process step 124 of FIG. 3a. With reference to FIG. 2f, it will be appreciated that the order of occurrence of marker outputs depends on the position from which velocity controlled motion is effected. The three marker outputs may be generated as successions P-I-P or I-P-I. To determine the value of INCR, it is necessary first to determine the succession of markers and then the orientation defining the direction toward the reference from which absolute position is defined. If the sum of the distances S1 and S2 of a given transducer total the constant distance INT, the succession is P-I-P. At process step 130 the distances $S1_{N,I}$ and $S2_{N,I}$ are added. At decision step 132 it is determined if the sum equals the constant distance INT. In the event the succession is P-I-P, the direction of velocity controlled motion determines which of the distances S1 and S2 correspond to the distance INCR. Since INCR is defined to be unique for each distance INT and increases incrementally in one direction, the difference of S1 and S2 can be used to determine the orientation establishing which of S1 and S2 correspond to INCR. At process step 134 the difference is calculated. Decision step 136 and process steps 138 and 140 select the value of S1 and S2 corresponding to INCR according to the following $(S2-S1)>0$, INCR=S1

$(S2-S1)<0$, INCR=S2

Had it been determined at decision step 132 that the sum of S1 and S2 did not equal the constant distance INT, the succession of markers is I-P-I. In this event, the value of INCR corresponds to either S2 or to the difference between S2 and the constant distance interval INT, the difference being designated S3. At process step 142, S3 is calculated. Following the same procedure used to discriminate between S2 and S1, the difference of S3 and S2 is used to select the value corresponding to INCR. At process step 144 the difference between S3 and S2 is calculated. Decision step 146 and process steps 148 and 150 are then used to select the value of S2 and S3 corresponding to INCR according to the following (S3–S2)>0, INCR=S2

(S3–S2)<0, INCR=S3

Following production of a value for INCR, calculation of actual position proceeds in accordance with equation (1) at process step 152. Execution of the procedure of the flow chart of FIG. 3a is continued through terminal 154.

While the invention has been described with reference to the detailed description of the preferred embodiment, it is not the intention of applicants that the invention be construed as being limited thereby. Rather, it is the intention of applicants that the scope of the invention be defined by the recitation of the claims and all equivalents thereof.

What is claimed is:

1. Method for reducing relative misalignment between a plurality of driving means for propelling a moveable member linearly transverse to its length, the misalignment being measured parallel to the axis of motion of the moveable member, the method comprising the steps of:
   a. determining the magnitude of relative misalignment between the driving means;
   b. effecting relative movement of the driving means to reduce the misalignment by an amount determined in accordance with the magnitude of relative misalignment;

wherein position of the driving means is measured by position transducers and the step of determining the magnitude of relative misalignment between the driving means further comprises the step of selecting a procedure for determining the difference between the positions indicated by the transducers according to the types of the transducers.

2. Method for reducing relative misalignment between a plurality of driving means for propelling a moveable member linearly transverse to its length, the misalignment being measured parallel to the axis of motion of the moveable member, the method comprising the steps of:
   a. determining the magnitude of relative misalignment between the driving means;
   b. effecting relative movement of the driving means to reduce the misalignment by an amount determined in accordance with the magnitude of relative misalignment;

wherein position of the driving means is measured by transducers which produce marker outputs and the step of determining the magnitude of relative misalignment between the driving means further comprises the steps of:
   a. moving the driving means simultaneously in the same direction to produce marker outputs from the transducers of all driving means;
   b. determining a position of each driving means from distances travelled between the occurrences of markers; and
   c. calculating magnitudes of relative misalignment from the positions of the driving means;

wherein the driving means are controlled by a servomechanism controller including a position control and the step of moving the driving means further comprises the step of disabling the position control and effecting velocity control of the driving means.

3. The method of claim 2 wherein the step of effecting relative movement further comprises the steps of:
   a. determining a value for commanded position which will result in no positional change when applied to the position control of a selected driving means;
   b. determining position command offset values in response to the magnitude of relative misalignment which will result in no positional change of all driving means other than the selected driving means when applied to the associated position controls;
   c. enabling the position controls with the determined value for commanded position and the determined values of position command offset values; and
   d. incrementally reducing the offset values to zero whereby position controlled relative motion of the driving means is effected.

4. The method of claim 2 wherein the step of calculating the relative misalignment further comprises the step of determining the relative positions of a selected driving means and of another driving means.

5. The method of claim 4 wherein the transducers are digital encoders and the step of determining the position of each driving means further comprises the steps of detecting the occurrence of a marker from one transducer and measuring the distance traveled as reflected by that transducer until the occurrence of a marker output in another encoder.

6. Method for reducing relative misalignment between a plurality of driving means for propelling a moveable member linearly transverse to its length, the misalignment being measured parallel to the axis of motion of the moveable member, the method comprising the steps of:
   a. determining the magnitude of relative misalignment between the driving means;
   b. effecting relative movement of the driving means to reduce the misalignment by an amount determined in accordance with the magnitude of relative misalignment;

wherein position of the driving means is measured by transducers which produce marker outputs and the step of determining the magnitude of relative misalignment between the driving means further comprises the steps of:
   a. moving the driving means simultaneously in the same direction to produce marker outputs from the transducers of all driving means;
   b. determining a position of each driving means from distances travelled between the occurrences of markers; and
   c. calculating magnitudes of relative misalignment from the positions of the driving means;

wherein the transducers are semi-absolute encoders and the step of determining the position of each driving means further comprises the steps of determining the relative magnitude of an interval distance between a first primary marker and an intermediate marker and the intermediate and a second primary marker and determining the position of the driving means from the smaller of the interval distances.

7. Apparatus for reducing relative misalignment between a plurality of driving means for propelling a moveable member linearly transverse to its length, the misalignment being measured parallel to the axis of motion of the moveable member, the apparatus comprising:

a. means for determining the magnitude of relative misalignment between the driving means;

b. means for effecting relative movement of the driving means to reduce the misalignment by an amount determined in accordance with the magnitude of relative misalignment;

wherein the positions of the driving means are indicated by position transducers and the means for determining the magnitude of relative misalignment between the driving means executes procedures selected according to the type of position transducer associated with the driving means.

8. The apparatus of claim 7 wherein the position transducers produce marker outputs and the means for determining the magnitude of relative misalignment between the driving means determines the distance traveled between occurrences of marker outputs during motion of the member in one direction.

9. The apparatus of claim 8 wherein each position transducer produces a single marker output within the range of the transducer position measurement and the means for determining the magnitude of the relative misalignment determines the distance traveled between the occurrence of a marker output from one transducer and the occurrence of a marker output from another transducer during motion of the member in one direction, the distance defining the relative misalignment between the two transducers.

10. The apparatus of claim 8 wherein each transducer produces plural marker outputs within the range of the transducer position measurement, the marker outputs including primary and intermediate markers, the intervals therebetween having a predetermined relationship one to another and the means for determining the magnitude of the relative misalignment determines position of each driving means by comparison of two intervals detected during motion in one direction and determines the distance defining the relative misalignment from the positions of the driving means.

11. The apparatus of claim 8 wherein the driving means are controlled by a servomechanism controller including position control and the motion during which position of the driving means is determined is effected with the position control disabled.

12. The apparatus of claim 11 wherein the means for determining the relative misalignment of driving means produces a position command offset for each position control associated with a driving means misaligned relative to a selected driving means and, with position control enabled, effects incremental reduction of the offsets to zero to eliminate the misalignment.

* * * * *